United States Patent [19]

Bailly

[11] Patent Number: 4,511,703

[45] Date of Patent: Apr. 16, 1985

[54] CATALYSTS FOR THE POLYMERIZATION AND COPOLYMERIZATION OF PROPYLENE AND POLYMERIZATION PROCESSES USING THESE CATALYSTS

[75] Inventor: Jean C. Bailly, Martigues, France

[73] Assignee: BP Chimie Societe Anonyme, Paris, France

[21] Appl. No.: 504,981

[22] Filed: Jun. 16, 1983

[30] Foreign Application Priority Data

Jun. 24, 1982 [FR] France ................. 82 11056

[51] Int. Cl.$^3$ ................. C08F 4/02; C08F 10/06
[52] U.S. Cl. ................. 526/125; 502/126; 502/127; 526/142; 526/348; 526/351; 526/909; 526/904
[58] Field of Search ................. 526/125

[56] References Cited

U.S. PATENT DOCUMENTS

| | | | |
|---|---|---|---|
| 3,135,809 | 6/1964 | Bosmojian | 260/650 |
| 4,220,554 | 9/1980 | Scata et al. | 526/124 |
| 4,250,288 | 2/1981 | Lowery et al. | 526/125 |
| 4,252,670 | 2/1981 | Caunt et al. | 526/125 |
| 4,314,912 | 2/1982 | Lowery et al. | 526/125 |
| 4,329,253 | 5/1982 | Goodall et al. | 526/125 |
| 4,364,851 | 12/1982 | Shiga et al. | 526/125 |
| 4,399,054 | 8/1983 | Ferraris et al. | 526/125 |
| 4,414,132 | 11/1983 | Goodall et al. | 526/125 |
| 4,442,224 | 4/1984 | Takitani et al. | 526/125 |
| 4,464,478 | 8/1984 | Scata et al. | 526/125 |

FOREIGN PATENT DOCUMENTS

| | | |
|---|---|---|
| 0024933 | 3/1981 | European Pat. Off. |
| 2143346 | 2/1970 | France . |
| 2014887 | 4/1970 | France . |
| 1580635 | 12/1980 | United Kingdom ................. 526/125 |

*Primary Examiner*—Edward J. Smith
*Attorney, Agent, or Firm*—Brooks Haidt Haffner & Delahunty

[57] ABSTRACT

The present invention relates to catalysts which can be used for the polymerization and copolymerization of propylene with other alpha-olefins, characterized in that they comprise a support containing essentially magnesium chloride and possibly a chlorinated aluminium derivative, and occurring in the form of spheroidal particles having a mean diameter by mass comprised between 10 and 100 microns and a particle size distribution such that the ratio of the mean diameter by mass to the mean diameter by number is less than or equal to 3, which support has been treated by an electron donor compound chosen from among the aromatic ethers and aromatic acid esters and which when impregnated with titanium tetrachloride comprises 0.5 to 3% of atoms of titanium per atom of magnesium, and process for utilizing the said catalyst.

5 Claims, No Drawings

CATALYSTS FOR THE POLYMERIZATION AND COPOLYMERIZATION OF PROPYLENE AND POLYMERIZATION PROCESSES USING THESE CATALYSTS

The present invention relates to new catalysts for the polymerisation and co-polymerisation of propylene and processes using these catalysts.

It is known that polymerisation and co-polymerisation catalysts for alpha-olefins, known as "Ziegler-Natta" catalysts, are obtained by the combination of transition metal compounds belonging to Groups IV, V or VI of the Periodic Table with at least one organometallic compound of Groups I to III of the Table.

It is also known that the properties of these catalysts may be strongly influenced when the said transition metal compound is used with a solid mineral compound which may be co-precipitated with the said transition metal compound or which is used as support for the said transition metal compound.

As mineral compound which can be used to advantage as the support, the oxides of magnesium and titanium, aluminium silicate, magnesium carbonate and magnesium chloride may be mentioned.

In this technique of a catalyst on a support, the properties of the support on the one hand and the process of preparation of the catalyst (deposition of the transition metal compound) on the other hand have a very great importance for the properties of the said catalyst.

The present invention relates to a supported catalyst, the support consisting essentially of magnesium chloride with specific properties and the catalyst being a compound of a metal belonging to Groups IV, V and VI of the Periodic Table of Elements and in particular a titanium compound known for its catalytic properties which can be used for the polymerisation and co-polymerisation of alpha-olefins.

The support for the catalyst consists of particles based essentially on magnesium chloride, these particles having the following characteristics:

the particles have a spheroidal form defined by the fact that if D and d are respectively the large and small diameters of the particles, D:d is less than or equal to 1.3;

the particles have a mean diameter by mass comprised between 10 and 100 microns approximately;

the particle size distribution of the particles is such that the ratio Dm:Dn of the mean diameter by mass, Dm, to the mean diameter by number, Dn, is less than or equal to 3, for example, comprised between 1.1 and 2.5; more preferably, the particle size distribution of the particles is very narrow and such that the ratio Dm:Dn is comprised between 1.1 and 1.5; furthermore there is a practically complete absence of particles with a diameter greater than $2 \times Dm$ or less than $0.2 \times Dm$; the particle size distribution, furthermore, is such that more than 90% by weight of the particles of each batch are comprised in the range Dm±10%;

the surface of the particles may be slightly dented such as that of a raspberry, but is preferably very smooth;

the specific surface area of the particles is comprised between about 20 and 60 m$^2$/g (BET);

the density of the particles is comprised between about 1.2 and 2.1;

the particles consist essentially of magnesium chloride and possibly of a chlorinated compound of aluminium; the atomic ratio Cl/(Mg+3/2.Al) is more or less equal to 2; furthermore the particles contain no products comprising Mg—C bonds, but contain a low proportion of an electron donor compound.

The supports defined in this way may be prepared in particular by reacting an organomagnesium compound with a chlorinated organic compound, in the presence of an electron donor compound. As organomagnesium compound one may select either a product of the formula $R_1MgR_2$, or an addition complex of the formula $R_1MgR_2.xAl(R_3)_3$, in which formulae $R_1$, $R_2$ and $R_3$ are identical or different alkyl radicals having 2 to 12 carbon atoms and x is comprised between 0.001 and 10, preferably between 0.01 and 2. As chlorinated organic compound one selects an alkyl chloride of the formula $R_4Cl$ in which $R_4$ is a secondary or preferably a tertiary alkyl radical with 3 to 12 carbon atoms. The electron donor compound employed is an organic compound which comprises at least one atom of oxygen, sulphur, nitrogen and/or phosphorus. It may be chosen from among a wide variety of products such as amines, amides, phosphines, sulphoxides, sulphones or ethers. Amongst electron donor compounds one may choose in particular an aliphatic ether-oxide of the formula $R_5—O—R_6$ in which $R_5$ and $R_6$ are identical or different alkyl radicals with 1 to 12 carbon atoms.

Moreover, the various reactants involved in the preparation of the supports as defined above must be employed under the following conditions:

the molar ratio $R_4Cl/R_1MgR_2$ is comprised between 1.5 and 2.5 and preferably between 1.95 and 2.2;

the molar ratio $R_4Cl/R_1MgR_2.xAl(R_3)_3$ is comprised between 1.5 (1+3/2.x) and 2.5 (1+3/2.x) and preferably between 1.95 (1+3/2.x) and 2.2 (1+3/2.x);

the molar ratio between the electron donor compound and the organomagnesium compound ($R_1MgR_2$ or $R_1MgR_2.xAl(R_3)_3$) is comprised between 0.01 and 2, and preferably between 0.01 and 1;

the reaction between the organomagnesium compound and the chlorinated organic compound takes place with agitation in a liquid hydrocarbon at a temperature comprised between 5° C. and 80° C., and preferably between 35° C. and 80° C.

The preparation of the catalysts from the supports thus defined comprises two stages, namely:

(a) a treatment of the said support by means of an electron donor compound which is an aromatic acid ester or an aromatic ether, (b) an impregnation of the support thus treated by means of titanium tetrachloride.

In the first stage the quantity of electron donor to be used is comprised between 0.06 and 0.2 mole of electron donor per mole of MgCl$_2$ of the support, and the temperature to be used is comprised between about 20° and 50° C.

In the second stage the support is impregnated with titanium tetrachloride which may be used in the pure state or in solution in a liquid hydrocarbon; the quantities of TiCl$_4$ must be sufficient so that 0.5 to 3% of titanium atoms per atom of magnesium present in the support can be fixed on the support; the temperature of impregnation is comprised between about 80° and 100° C. The catalyst obtained is washed several times with a liquid hydrocarbon.

The catalysts prepared according to the present invention consist of particles whose physical properties such as spheroidal form, surface appearance, mean diameter by mass and particle size distribution as defined by the ratio Dm:Dn, are more or less identical to those of the magnesium chloride support particles from which they originated.

According to one known technique these catalysts are employed in the polymerisation of alpha-olefins in association with a co-catalyst. This association of a catalyst and co-catalyst constitutes what is referred to as the "catalyst complex".

The co-catalyst is generally an organoaluminium compound of the formula $Al(R_7)_3$, in which $R_7$ is an alkyl radical with 2 to 12 carbon atoms; it is preferably employed in the complexed state with an electron donor compound, for example of the aromatic acid ester type. The molar ratio between the electron donor compound and the organoaluminium compound is comprised between 0.1 and 0.5 and is preferably equal to about 0.3. An inadequate quantity of this electron donor compound diminishes the stereospecificity of the "catalyst complex" and too great a quantity of this electron donor compound weakens the activity of the "catalyst complex".

The relative molar quantities of the organoaluminum compound in relation to the titanium compound used may vary within a very wide field; for example the atomic ratio Al:Ti may vary between 1 and 200.

The "catalyst complex" may be prepared by simply mixing the catalyst and co-catalyst. It may be employed in the polymerisation in suspension in a liquid hydrocarbon or in the liquid monomer; however, it is possible, especially if it is desired to use the said "catalyst complex" in a dry polymerisation or copolymerisation to carry out a coating of the said "catalyst complex" by prepolymerisation. This prepolymerisation must be performed in suspension in a liquid hydrocarbon medium until the product obtained comprises 0.1 to 10 g of polymer or copolymer per gramme-milliatom of titanium; it may then be continued either in suspension in a liquid hydrocarbon medium, or in the dry state, until the prepolymer obtained contains about 10 to 500 g of polymer or copolymer per gramme-milliatom of titanium.

It is important to note that when using the support and the catalysts as described above, the development of each particle during the pre-polymerisation and subsequently during the polymerisation or copolymerisation is perfectly regular, so that one obtains polymer or copolymer powders whose dimensions are more or less proportional to those of the support particles and the catalyst particles.

Method for determining the mean diameters by mass (Dm) and by number (Dn) of the particles of magnesium chloride support or catalyst According to the invention, the mean diameters by mass (Dm) and by number (Dn) of the particles of magnesium chloride support or catalyst are measured by microscopic observation by means of the OPTOMAX image analyser (Micro-Measurements Ltd., Great Britain). The measuring principle consists in obtaining from the experimental study by optical microscopy of a population of particles a table of frequencies giving the number ($n_i$) of particles belonging to each category (i) of diameters, each category (i) being characterised by an intermediate diameter ($d_i$) comprised between the limits for the said category. According to the French Norm NF X 11-630 of June 1981, Dm and Dn are given by the following formula:

$$\text{mean diameter by mass: } Dm = \frac{\Sigma\ n_i(d_i)^3 d_i}{\Sigma\ n_i(d_i)^3}$$

$$\text{mean diameter by number: } Dn = \frac{\Sigma\ n_i \cdot d_i}{\Sigma\ n_i}$$

The ratio Dm:Dn characterises the particle size distribution; it is sometimes referred to as the "width of particle size distribution".

The measurement by the OPTOMAX image analyser is performed by means of an inverted microscope which makes it possible to examine the suspensions of magnesium chloride or catalyst particles at an enlargement comprised between 16x and 200x. A television camera picks up the images given by the inverted microscope and transmits them to a computer which analyses the images line by line and dot by dot on each line, in order to determine the dimensions or diameters of the particles and then to classify them.

The following non-restrictive examples illustrate the invention.

EXAMPLE 1

1.1 Preparation of the support

Into a glass reactor with a capacity of 1 liter and provided with an agigation system rotating at 750 revolutions per minute there are introduced at ambient temperature and under nitrogen 550 ml of a solution of di-butyl magnesium in n-hexane containing 500 gramme-milliatoms of magnesium and 51 ml of di-isoamyl ether (250 millimoles).

The reactor is then heated to 50° C. and over 2 hours 115 ml of t-butyl chloride (1050 millimoles) are poured in drop by drop. At the end of this addition the suspension is maintained at 50° C. for 2 hours and the precipitate obtained is washed at the same temperature with n-hexane.

The support thus formed contains per gramme-atom of magnesium: 2.0 gramme-atomes of chlorine and 0.011 mole of di-isoamyl ether.

On examination under the microscope the support is seen to be in the form of spheroidal particles (the ratio D:d between the large and small axes of the particles is on average equal to 1.2) having a particle size distribution such that Dm:Dn=1.2, with Dm=38 microns; one finds that more than 90% by weight of the particles have a mean diameter comprised between 34 and 42 microns; the particles have a smooth surface, a specific surface area equal to 42 m$^2$/g (BET) and a density equal to 1.3.

1.2 Preparation of the catalyst

Into a glass reactor with a capacity of 1 liter and provided with an agitator system rotating at 250 revolutions per minute there are introduced under nitrogen 500 ml of a suspension in n-hexane of the support prepared in Example 1.1, this suspension containing 0.2 gramme-atom of magnesium. After decanting, the supernatant hydrocarbon phase is removed. The reactor is then heated to 50° C. and 2 ml of ethylbenzoate (14 millimoles) are introduced. The suspension is maintained under agitation for 2 hours, then 2 moles of pure titanium tetrachloride are introduced (220 ml). The temperature is raised to 80° C. and this temperature is maintained for 2 hours. The solid obtained is then washed with n-hexane at 50° C. to produce the catalyst ready for use, in the form of a suspension in n-hexane.

Analysis of the catalyst shows that it contains per gramme-atom of magnesium 2.05 gramme-atoms of chlorine, 0.014 gramme-atom of titanium, 0.016 mole of ethylbenzoate and that it contains no trace of di-isoamyl ether.

The catalyst thus defined is a yellow-greyish powder, consisting of spheroidal particles, having a particle size distribution such that $Dm:Dn=1.2$, with $Dm=38$ microns; it is found, furthermore, that more than 90% by weight of the particles have a mean diameter comprised between $Dm\pm10\%$; the particles have a surface as smooth as the initial support.

EXAMPLE 2

2.1 Preparation of the support

The preparation of the support is identical to that of example 1.1, except that 56 ml (275 millimoles) of di-isoamyl ether are used instead of 51 ml (250 millimoles), and 120 ml (1100 millimoles) of t-butyl chloride instead of 115 ml (1050 millimoles), that is to say 0.55 moles of di-isoamyl ether and 2.2 moles of t-butyl chloride are used per mole of di-butyl magnesium.

The support thus obtained contains per gramme-atom of magnesium: 2.0 gramme-atoms of chlorine and 0.015 mole of di-isoamyl ether.

On examination under the microscope the support is seen to be in the form of spheroidal particles with a particle size distribution such that $Dm:Dn=1.3$, with $Dm=40$ microns; it is found that more than 90% by weight of the particles have a mean diameter by mass comprised between 36 and 44 microns; the particles have a smooth surface.

2.2 Preparation of the catalyst

Into a glass reactor with a capacity of 1 liter and provided with an agitation system rotating at 250 revolutions per minute there are introduced under nitrogen 500 ml of a suspension in n-hexane of support prepared as in Example 2.1, containing 200 gramme-milliatoms of magnesium. After decanting, the supernatant hydrocarbon phase is removed. The reactor is then heated to 50° C. and 3 ml (21 millimoles) of ethylbenzoate are introduced. The suspension is maintained under agitation for 1 hour, then the temperature is raised to 80° C. to eliminate the n-hexane by means of a current of nitrogen. Then 3 moles of pure $TiCl_4$ (330 ml) are introduced into the reactor and the mixture is maintained under agitation for 2 hours at 80° C. The catalyst obtained is washed with n-hexane at 50° C. to give the catalyst ready for use in the form of a suspension in n-hexane.

Analysis of the catalyst thus obtained shows that it contains per gramme-atom of magnesium 2.05 gramme-atoms of chlorine, 0.030 mole of ethylbenzoate, 0.020 mole of titanium, and that it contains no trace of di-isoamyl ether.

The catalyst thus defined is a powder consisting of spheroidal particles, having a particle size distribution such that $Dm:Dn=1.3$ with $Dm=40$ microns; it is found that more than 90% by weight of the particles have a mean diameter by mass comprised between 36 and 44 microns; the particles have a surface as smooth as that of the initial support.

EXAMPLE 3

There are used in this Example as support a powder based on magnesium chloride, consisting of spheroidal particles having a particle size distribution such that $Dm:Dn=1.1$, with $Dm=20$ microns; more than 90% by weight of the particles of this powder have a mean diameter comprised between 18 and 22 microns.

Preparation of the catalyst

The preparation of the catalyst is identical to that of Example 1. A solid catalyst is obtained ready for use in the form of a suspension in n-hexane. The chemical analysis of this catalyst shows that it contains, per gramme-atom of magnesium, 2.00 gramme-atoms of chlorine, 0.014 gramme-atom of titanium, 0.016 mole of ethylbenzoate and no trace of di-isoamyl ether.

This catalyst consists of spheroidal particles, having a particle size distribution such that $Dm:Dn=1.1$ with $Dm=20$ microns; it is found furthermore that more than 90% by weight of the particles have a mean diameter comprised between 18 and 22 microns; the particles have a surface appearance identical to that of the initial support.

EXAMPLE 4

There is utilised as support a powder based on magnesium chloride consisting of spheroidal particles having a narrow particle size distribution, such that $Dm:Dn=1.5$, with $Dm=30$ microns; it has a density equal to 1.9 and a specific surface area equal to 46 $m^2/g$ (BET); the surface of the particles is very smooth.

Preparation of the catalyst

The preparation of the catalyst is identical to that of Example 1. There is obtained a solid catalyst ready for use, in the form of a suspension in n-hexane. The chemical analysis of the catalyst shows that it contains, per gramme-atome of magnesium, 2.00 gramme-atoms of chlorine, 0.015 gramme-atom of titanium, 0.018 mole of ethylbenzoate and no trace of di-isoamyl ether.

This catalyst consists of spheroidal particles having a particle size distribution such that $Dm:Dn=1.5$ with $Dm=30$ microns; the particles have a surface as smooth as that of the initial support.

EXAMPLE 5

There is used as support a powder based on magnesium chloride consisting of a spheroidal particles having a narrow particle size distribution, such that $Dm:Dn=2.5$, with $Dm=35$ microns; this powder contains less than 0.05% by weight of particles of diameter less than 7 microns; it has a density equal to 1.8 and a specific surface area equal to 44 $m^2/g$ (BET); the surface of the particles is smooth.

Preparation of the catalyst

The preparation of the catalyst is identical to that of Example 1. There is obtained a solid catalyst ready for use, in the form of a suspension in n-hexane. The chemical analysis of the catalyst shows that it contains, per gramme-atome of magnesium, 2.05 gramme-atoms of chlorine, 0.018 gramme-atom of titanium, 0.018 mole of ethylbenzoate and no trace of di-isoamyl ether.

The catalyst consists of spheroidal particles having a particle size distribution such that $Dm:Dn=2.5$ with $Dm=35$ microns; the particles have a surface as smooth as that of the initial support.

EXAMPLE 6

Suspension polymerisation

Into a stainless steel reactor with a capacity of 5 liters and provided with an agitation system rotating at 750 revolutions per minute there are introduced under a blanket of nitrogen 2 liters of n-hexane heated to 50° C., 10 millimoles of tri-isobutyl aluminium (TiBA), 3.7 millimoles of methyl paratoluate and a quantity of catalyst prepared as in Example 1, corresponding to 0.08 gramme-milliatom of titanium. The reactor is heated to 60° C. and a volume of 40 ml of hydrogen measured under normal conditions is introduced, then propylene at a rate of 300 g/hr. for 2 hours. At the end of the one hour of introduction of propylene, a supplementary volume of 40 ml of hydrogen measured under normal conditions is added to the reactor. At the end of the introduction of propylene, the polypropylene suspension is maintained under agitation and at 60° C. for a further half-hour. Then the non-polymerised propylene is de-gassed and the n-hexane is evaporated from the polypropylene suspension. 480 g of a dry polypropylene powder are obtained having the following characteristics:

titanium content: 8 ppm (corresponding to a polymerisation yield of 6 kg/gramme-milliatom of titanium of the catalyst)

apparent voluminal mass (AVM): 0.41 g/cm$^3$ content of polymer insoluble in boiling n-heptane: 92% by weight melt index under 5 kg. at 190° C.: 1.8 g/10 minutes mean diameter by mass (Dm): 250 microns powder consisting of spheroidal particles with a narrow particle size distribution and a smooth surface.

EXAMPLE 7

Suspension polymerisation

One proceeds exactly as in Example 6 except that the catalyst prepared as in Example 2 is employed instead of the catalyst prepared as in Example 1. 410 g of a dry polypropylene powder are obtained having the characteristics described in Table I.

EXAMPLE 8

Suspension polymerisation

One proceeds exactly as in Example 6, except that the catalyst prepared as in Example 3 is employed. 395 g of a dry polypropylene powder are obtained having the characteristics described in Table I.

EXAMPLE 9

Suspension polymerisation

One proceeds exactly as in Example 6, except that 5 millimoles of methyl paratoluate are used instead of 3.7 millimoles, and a quantity of the catalyst prepared as in Example 1 corresponding to 0.135 gramme-milliatom of titanium, instead of 0.08 gramme-milliatom of titanium. 430 g of a dry polypropylene powder are obtained having the characteristics described in Table I.

EXAMPLE 10

Suspension polymerisation

One proceeds exactly as in Example 6, except that one uses 2.5 millimoles of methyl paratoluate instead of 3.7 millimoles, and a quantity of catalyst prepared as in Example 1 corresponding to 0.135 gramme-milliatom of titanium instead of 0.08. 600 g of dry polypropylene powder are obtained having the characteristics described in Table I.

EXAMPLE 11

Suspension polymerisation

One proceeds exactly as in Example 6, except that 10 millimoles of triethylaluminium (TEA) are used instead of 10 millimoles of TiBA, and 3.3 millimoles of methyl paratoluate instead of 3.7 millimoles. 500 g of a dry polypropylene powder are obtained having the characteristics described in Table I.

EXAMPLE 12

Suspension polymerisation

One proceeds exactly as in Example 6, except that 10 millimoles of tri-n-octylaluminium (TnOA) are used instead of 10 millimoles of TiBA, 4 millimoles of methyl paratoluate instead of 3.7 millimoles, and a quantity of the catalyst prepared as in Example 1 corresponding to 0.1 gramme-milliatom of titanium, instead of 0.08 gramme-milliatom. 450 g of a dry polypropylene powder are obtained having the characteristics described in Table I.

EXAMPLE 13

Sequenced copolymerisation in suspension

One proceeds exactly as in Example 6, except that propylene is introduced into the reactor at a rate of 300 g/hr. for an hour-and-a-half, instead of for two hours, and that at the end of this time the reactor is de-gassed to 0.1 MPa and a mixture of ethylene and propylene containing 80% by weight of ethylene are introduced at a rate of 200 g/hr. for half-an-hour. At the end of this period the copolymer suspension is maintained under agitation and at 60° C. for a further half-hour. 450 g of a dry sequenced copolymer powder of ethylene and propylene are obtained possessing a content of units derived from ethylene equal to 9% by weight (measured by infrared spectrography) and having the other characteristics described in Table I.

EXAMPLE 14

Statistical copolymerisation in suspension

One proceeds exactly as in Example 6, except that a mixture of propylene and ethylene containing 5% by weight of ethylene is introduced into the reactor instead of propylene alone. 400 g of a dry powder of a statistical copolymer of propylene and ethylene are obtained possessing a content of units derived from ethylene equal to 5% by weight (measured by infrared spectrography) and having the other characteristics described in Table I.

EXAMPLE 15

Suspension polymerisation

One proceeds exactly as in Example 6, except that the catalyst prepared as in Example 4 is used. 460 g of a dry polypropylene powder are obtained having the characteristics described in Table I.

EXAMPLE 16

Suspension polymerisation

One proceeds exactly as in Example 6, except that the catalyst prepared as in Example 5 is used. 500 g of a dry polypropylene powder are obtained having the characteristics described in Table 1.

TABLE I

| Example | Weight of polymer produced (g) | Duration of polymerisation (hours) | Titanium content in the polymer (ppm) | Yield (kg of polymer per gramme-milliatom of titanium) | AVM (g/cm³) | Melt index at 5 kg/ 190° C. (g/10 mins) | Mean diameter by mass (Dm) (microns) | Content of polymer insoluble in boiling n-heptane (% by weight) |
|---|---|---|---|---|---|---|---|---|
| 6 | 480 | 2½ | 8 | 6 | 0.41 | 1.8 | 250 | 92 |
| 7 | 410 | 2½ | 12 | 4 | 0.38 | 1.3 | 250 | 90 |
| 8 | 395 | 2½ | 13 | 3.7 | 0.42 | 2.0 | 120 | 93 |
| 9 | 430 | 4 | 15 | 3.2 | 0.36 | 0.9 | 250 | 91 |
| 10 | 600 | 2½ | 10 | 4.8 | 0.36 | 1.3 | 260 | 80 |
| 11 | 500 | 3 | 9 | 5.3 | 0.42 | 1.5 | 250 | 92 |
| 12 | 450 | 3 | 12 | 4 | 0.42 | 1 | 250 | 93 |
| 13 | 450 | 2½ | 9 | 5.3 | 0.36 | — | 250 | 80 |
| 14 | 400 | 2½ | 12 | 4 | 0.40 | — | 250 | 85 |
| 15 | 460 | 2½ | 8 | 6 | 0.43 | — | 200 | 92 |
| 16 | 500 | 2½ | 8 | 6 | 0.45 | — | 230 | 91 |

EXAMPLE 17

Polymerisation in liquid propylene

Into a 5-liter stainless steel reactor equipped with an agitator rotating at 750 revolutions per minute there are introduced under a blanket of nitrogen 10 millimoles of TiBA, 3.7 millimoles of methyl paratoluate and a quantity of the catalyst prepared as in Example 1 corresponding to 0.1 gramme milliatom of titanium.

The reactor is purged with gaseous propylene and 1.5 kg of liquid propylene is introduced, and a volume of 200 ml of hydrogen measured under normal conditions. The reactor is then heated to 60° C. and the polymerisation reaction lasts an hour and a half. At the end of this period, the excess propylene is de-gassed and after steam distillation 600 g of a dry white polypropylene powder are recovered having the following characteristics:

titanium content: 8 ppm
apparent voluminal mass (AVM): 0.49 g/cm³
content of polymer insoluble in boiling n-heptane: 92% by weight
melt index under 5 kg. at 190° C.: 2.3 g/10 minutes
mean diameter by mass (Dm): 250 microns
powder consisting of spheroidal particles, with a narrow particle size distribution and a smooth surface.

EXAMPLE 18

Polymerisation in liquid propylene

One proceeds exactly as in Example 17, except that a quantity of the catalyst prepared as in Example 2, corresponding to 0.08 gramme-milliatom of titanium, is introduced into the reactor instead of the quantity of the catalyst prepared in Example 1 corresponding to 0.1 gramme-milliatom of titanium, and a volume of 400 ml of hydrogen measured under normal conditions, instead of 200 ml, and that the reaction of polymerising the propylene lasts for two hours instead of one-and-a-half hours. 650 g of a dry polypropylene powder are obtained having the following characteristics:

titanium content: 6 ppm
apparent voluminal mass (AVM): 0.48 g/cm³
content of polymer insoluble in boiling n-heptane: 92% by weight
melt index under 5 kg. at 190° C.: 3.9 g/10 minutes
mean diameter by mass (Dm): 280 microns
powder consisting of spheroidal particles with a narrow particle size distribution and a smooth surface.

EXAMPLE 19

Polymerisation in liquid propylene

One proceeds exactly as in Example 17, except that a quantity of the catalyst prepared as in Example 3, corresponding to 0.05 gramme-milliatom of titanium, is introduced into the reactor instead of the quantity of the catalyst prepared in Example 1 corresponding to 0.1 gramme-milliatom of titanium, and that the polymerisation reaction of the propylene lasts for two hours instead of one-and-a-half hours. 450 g of a dry polypropylene powder are obtained having the following characteristics:

titanium content: 5 ppm
apparent voluminal mass (AVM): 0.50 g/cm³
content of polymer insoluble in boiling n-heptane: 91% by weight
melt index under 5 kg. at 190° C.: 1.6 g/10 minutes
mean diameter by mass (Dm): 150 microns
powder consisting of spheroidal particles with a narrow particle size distribution and a smooth surface.

EXAMPLE 20

20.1 Preparation of a suspension prepolymer

Into a stainless steel reactor with a capacity of 5 liters and provided with an agitation system rotating at 750 revolutions per minute there are introduced under a blanket of nitrogen 25 millimoles of TiBA, 9.25 millimoles of methyl paratoluate and a quantity of the catalyst prepared as in Example 1 corresponding to 2.5 gramme-milliatoms of titanium. The volume of the suspension is made up to 2 liters with n-hexane. At ambient temperature (20° C.) there is introduced into the reactor a volume of 30 ml of hydrogen measured under normal conditions, then propylene at a rate of 200 g/hr. for two and-a-half hours. At the end of this period the prepolymer suspension is maintained under agitation for a further half-hour. The reactor is de-gassed and, still under a blanket of nitrogen, the prepolymer powder is washed 3 times with n-hexane. The prepolymer suspension in n-hexane is then decanted into a rotary evaporator under a vacuum. 510 g of a dry prepolymer powder are obtained, consisting of spheroidal particles with a narrow particle size distribution, a mean diameter by mass equal to 110 microns, a smooth surface and having a titanium content equal to 240 ppm. This powder is preserved under nitrogen.

20.2 Dry-phase polymerisation (agitated bed)

25 g of the dry prepolymer powder prepared as in Example 20.1 and containing 0.125 gramme-milliatom of titanium are impregnated with a mixture of 5 millimoles of a solution of TEA in n-hexane and 1.65 millimoles of methyl paratoluate. This impregnated powder is introduced into a stainless steel reactor with a capacity of 2 liters and provided with an agitation system for dry powder. 100 g of a perfectly dry and anhydrous polypropylene powder are added. This mixture of powders is maintained under agitation and scavenged with nitrogen at 80° C. until a powder which will flow well is obtained. The reactor is then heated to 60° C. Propylene is introduced until a pressure of 1 MPa is obtained and this is maintained constant throughout the entire duration of the polymerisation by topping up with propylene. In addition, a volume of 50 ml of hydrogen measured under normal conditions is added each hour to the reactor. After 5 hours of reaction, the reactor is degassed. 625 g of a dry powder are recovered of which 500 g produced by the present propylene polymerisation reaction have the following characteristics:

titanium content: 12 ppm
apparent voluminal mass (AVM): 0.48 g/cm$^3$
content of polymer insoluble in boiling n-heptane: 91% by weight
melt index under 5 kg. at 190° C.: 1.1 g/10 minutes
mean diameter by mass (Dm): 250 microns
powder consisting of spheroidal particles with a narrow particle size distribution and a smooth surface.

EXAMPLE 21

Dry-phase polymerisation (fluidised bed)

Into a fluidised-bed reactor with a diameter of 15 cm, operating with a rising gas propelled at a speed of 15 cm/sec and under partial pressures of 0.1 MPa of hydrogen and 1.5 MPa of propylene, there are introduced in sequence 16 g/hr of the dry prepolymer powder prepared as in Example 20.1. A solution in n-hexane of a mixture of TnOA and methyl paratoluate in a molar ratio of 1:0.25 is introduced continuously at a rate corresponding to 9 millimoles of TnOA per hour. The temperature of the fluidised bed is maintained at 60° C. throughout the whole of the polymerisation. By sequenced withdrawals one obtains approximately 500 g/hr of a dry polypropylene powder which can be used directly and having the following characteristics:

titanium content: 8 ppm
apparent voluminal mass (AVM): 0.45 g/cm$^3$
content of polymer insoluble in boiling n-heptane: 90% by weight
melt index under 5 kg. at 190° C.: 2.3 g/10 minutes
mean diameter by mass (Dm): 250 microns
powder consisting of spheroidal particles with a narrow particle size distribution and a smooth surface.

EXAMPLE 22

Dry-phase copolymerisation (fluidised bed)

One proceeds exactly as in Example 21, except that the fluidised-bed reactor operates under partial pressures of 1.4 MPa of propylene and 0.1 MPa of ethylene instead of 1.5 MPa of propylene alone.

By a series of withdrawals one obtains approximately 400 g/hr of a dry propylene and ethylene copolymer powder which can be used directly and having the following characteristics:

titanium content: 10 ppm
apparent voluminal mass (AVM): 0.44 g/cm$^3$
content of polymer insoluble in boiling n-heptane: 85% by weight
content of units derived from ethylene: 5% by weight (measured by infrared spectrography)
melt index under 5 kg. at 190° C.: 3 g/10 minutes
mean diameter by mass (Dm): 240 microns
powder consisting of spheroidal particles with a narrow particle size distribution and a smooth surface.

We claim:

1. Process for the polymerisation of propylene, or the copolymerisation of propylene with other alpha-olefins, in the presence of a catalyst, characterised in that the said catalyst comprises a support containing essentially magnesium chloride, or magnesium chloride with a chlorinated derivative of aluminum, and an electron donor compound, but no product comprising a Mg—C bond, this support having a density comprised between 1.2 and 2.1 and a specific surface area comprised between 20 and 60 m$^2$/g (BET), and occurring in the form of spheroidal particles, having a mean diameter by mass comprised between 10 and 100 microns and a particle size distribution such that the ratio of the mean diameter by mass, Dm, to the mean diameter by number, Dn, is less than or equal to 3, which support has been treated with an electron donor compound chosen from among the aromatic ethers and the esters of an aromatic acid, and which when impregnated with titanium tetrachloride comprises 0.5 to 3% of atoms of titanium per atom of magnesium, and further characterised in that the said polymerisation or copolymerisation is carried out in the presence of a co-catalyst of the formula Al(R$_7$)$_3$, in which R$_7$ is an alkyl radical having 2 to 12 carbon atoms.

2. Process in accordance with claim 1, characterised in that the said co-catalyst is used in the complexed state by the addition of 0.1 to 0.5, mole per mole of Al(R$_7$)$_3$ of an electron donor compound, of the type of an ester of an aromatic acid.

3. Process in accordance with one of claims 1 and 2, characterised in that a prepolymerisation of the propylene, or a precopolymerisation of the propylene with other alpha-olefins, is carried out in such a way that the prepolymer obtained contains from 0.1 to 500 g of polymer or copolymer per gramme-milliatom of titanium.

4. Process in accordance with claim 2, characterised in that the co-catalyst is used in the complexed state by the addition of 0.3 mole per mole of Al(R$_7$)$_3$ of an election donor compound, of the type of an ester of an aromatic acid.

5. Process for the polymerisation of propylene, or the copolymerisation of propylene with other alpha-olefins, in the presence of a catalyst, characterised in that the said catalyst comprises a support containing essentially magnesium chloride, or magnesium chloride with a chlorinated derivative of aluminum, and an electron donor compound, but no product comprising a Mg—C bond, this support having a density comprised between 1.2 and 2.1 and a specific surface area comprised between 20 and 60 m$^2$/g (BET), and occurring in the form of spheroidal particles, having a mean diameter by mass, Dm, comprised between 10 and 100 microns and a particle size distribution such that more than 90% by weight of the particles of each batch are comprised within the range Dm±10%, which support has been treated with an electron donor compound chosen from among the aromatic ethers and the esters of an aromatic acid, and which when impregnated with titanium tetrachloride comprises 0.5 to 3% of atoms of titanium per atom of magnesium, and further characterised in that the said polymerisation or copolymerisation is carried out in the presence of a co-catalyst of the formula $Al(R_7)_3$, in which $R_7$ is an alkyl radical having 2 to 12 carbon atoms.

* * * * *

UNITED STATES PATENT AND TRADEMARK OFFICE
CERTIFICATE OF CORRECTION

PATENT NO. :    4,511,703
DATED      :    April 16, 1985
INVENTOR(S) :   JEAN C. BAILLY It is certified that error appears in the above-identified patent and that said Letters Patent is hereby corrected as shown below:

Col. 2, line 67, "when" should read --mean--

Signed and Sealed this

Twenty-seventh Day of August 1985

[SEAL]

Attest:

DONALD J. QUIGG

Attesting Officer

Acting Commissioner of Patents and Trademarks